(12) United States Patent
Fujioka et al.

(10) Patent No.: US 6,476,901 B2
(45) Date of Patent: *Nov. 5, 2002

(54) LIQUID CRYSTAL DISPLAY INCLUDING INTERLAYER INSULATING LAYER AT PERIPHERAL SEALING PORTION

(75) Inventors: Kazuyoshi Fujioka, Higashiosaka; Takayuki Shimada, Yamatokoriyama, both of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/166,217

(22) Filed: Oct. 5, 1998

(65) Prior Publication Data

US 2001/0003476 A1 Jun. 14, 2001

(30) Foreign Application Priority Data

Oct. 6, 1997 (JP) ............................... 9-273162

(51) Int. Cl.⁷ ........................................... G02F 1/1345
(52) U.S. Cl. ........................................ 349/149; 349/153
(58) Field of Search ........................... 349/151, 153, 349/149, 122, 138, 152, 143

(56) References Cited

U.S. PATENT DOCUMENTS

| | | | | |
|---|---|---|---|---|
| 5,585,951 A | * | 12/1996 | Noda et al. | 349/122 |
| 5,641,974 A | | 6/1997 | den Boer et al. | |
| 5,780,871 A | | 7/1998 | den Boer et al. | |
| 5,914,763 A | * | 6/1999 | Fujii et al. | 349/149 |
| 5,982,470 A | * | 11/1999 | Nakahara et al. | 349/153 |
| 5,995,189 A | * | 11/1999 | Zhang | 349/153 |

FOREIGN PATENT DOCUMENTS

| | | | |
|---|---|---|---|
| JP | 3-56942 | 3/1991 | |
| JP | 4-68318 A | 3/1992 | |
| JP | 6-186579 | * 7/1994 | ............ 349/138 |
| JP | 6-308510 A | 11/1994 | |
| JP | 7-092477 | 4/1995 | |
| JP | 7-128670 A | 5/1995 | |
| JP | 9-152625 A | 6/1997 | |
| JP | 9-179130 | 7/1997 | |
| KR | 96-15726 | 5/1996 | |

OTHER PUBLICATIONS

Liquid Crystals Applications and Uses, vol. 1, World Scientific, p. 178–179, 1992.*
Japanese Office Action dated Apr. 12, 2002.

* cited by examiner

Primary Examiner—Kenneth Parker
(74) Attorney, Agent, or Firm—Nixon & Vanderhye P.C.

(57) ABSTRACT

A liquid crystal display device according to the present invention includes a first substrate; a second substrate; a liquid crystal layer interposed between the first substrate and the second substrate; and a sealing member formed of a sealing material for confining the liquid crystal layer between the first substrate and the second substrate, the sealing member defining a sealing portion. The first substrate includes a plurality of gate signal lines, a plurality of source signal lines, a plurality of switching devices disposed in the vicinity of intersections of the plurality of gate signal lines and the plurality of source signal lines, a plurality of pixel electrodes respectively connected to the plurality of source signal lines through the plurality of switching devices, and an interlayer insulating layer provided below the plurality of pixel electrodes and covering the plurality of switching devices, the plurality of gate signal lines and the plurality of source signal lines. The second substrate includes a counter electrode opposing the plurality of pixel electrodes with the liquid crystal layer interposed therebetween. The first substrate includes a part of the interlayer insulating layer.

16 Claims, 5 Drawing Sheets

LIQUID CRYSTAL DISPLAY INCLUDING INTERLAYER INSULATING LAYER AT PERIPHERAL SEALING PORTION

BACKGROUND OF THE INVENTION

1. Field of the Invention

The present invention relates to a liquid crystal display device (hereinafter, referred to an "LCD device") usable in, for example, computers and wordprocessors.

2. Description of the Related Art

Conventionally, active matrix LCD devices are known. An active matrix LCD device includes an active matrix substrate, a counter substrate, and a liquid crystal layer acting as a display medium held between the active matrix substrate and the counter substrate. The active matrix substrate includes switching devices such as thin film transistors (hereinafter, referred to as "TFTs") and pixel electrodes which are both disposed in a matrix. The counter substrate includes a counter electrode and optionally a color filter. The active matrix substrate and a counter substrate are assembled together by a sealing member formed of a sealing material provided along perimeters thereof, with a prescribed gap retained therebetween.

Figure 1:
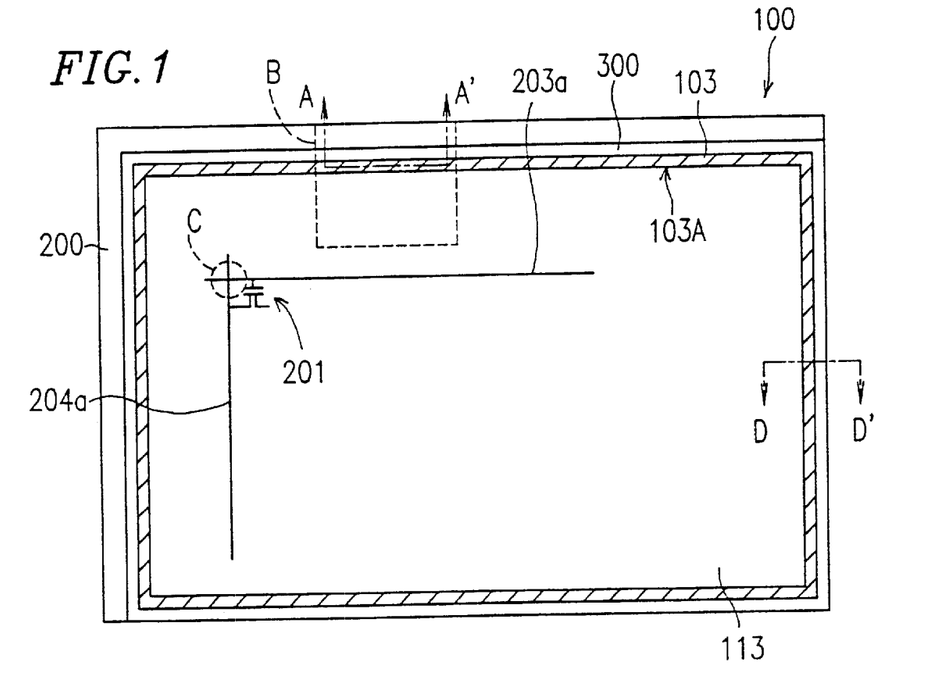
FIG. 1 is a plan view of an LCD device according to the present invention and a conventional LCD device.

Referring to FIG. 1, a plan view of an LCD device 100 is shown having an active matrix substrate 200, a counter substrate 300, and a sealing member 103. A "sealing portion" is representatively depicted and is a three-dimensional region defined by the sealing member 103 (hatched area). Three-dimensionally, the sealing portion extends between a top and bottom of the LCD device 100 in a direction perpendicular to the sheet of FIG. 1. Two-dimensionally, the sealing portion is restricted by the sealing member 103. The term "cell thickness" represents a distance between the active matrix substrate and the counter substrate after assembly.

In one known type of active matrix LCD device, the active matrix substrate includes an interlayer insulating layer for covering TFTs, gate signal lines for supplying a scanning signal for controlling the TFTs, and source signal lines for supplying a display signal. The pixel electrodes are disposed on the interlayer insulating layer. Thus, the pixel electrodes overlap the TFTs, the gate signal lines and the source signal lines. In such a structure, an area of the LCD device excluding an area having the TFTs, the gate signal lines and the source signal lines can entirely be used as an aperture for display. Thus, the numerical aperture is increased, thereby improving the brightness of the display.

The interlayer insulating layer is used for compensating for an uneven surface of a structure formed of the gate signal line generally having a thickness of about 0.3 μm, the source signal lines generally having a thickness of about 0.3 μm, and the TFTs generally having a thickness of about 1 μm. The interlayer insulating layer is also used for reducing the parasitic capacitances between the pixel electrodes and the gate signal lines and the parasitic capacitances between the pixel electrodes and the source signal lines. The interlayer insulating layer is generally formed by coating a base plate, which has the above-described structure thereon, with an acrylic photosensitive resin film having a dielectric constant of about ε=4 by spin-coating. The interlayer insulating layer needs to have a thickness of about 3 μm or more in order to achieve the above-described purposes.

When a film is formed by spin-coating, an error in film thickness of about ±5% is unavoidable. For example, when the average thickness of the film is set to be 3 μm, the film thickness has a maximum deviation of 0.3 μm.

The interlayer insulating layer is usually disposed in a sealing portion as well as the display area. The reason is that removal of the interlayer insulating layer from the sealing portion directly causes an error of 0.3 μm in the cell thickness. In general, a tolerance regarding the cell thickness nonuniformity during the production process of LCD devices is 0.5 μm. The error of 0.3 μm, which corresponds to as much as 60% of the tolerance, makes the control of the cell thickness during the production process very difficult. Although the thickness of the interlayer insulating layer is nonuniform in a broad area, the cell thickness can be made uniform by providing spacers between the active matrix substrate and the counter substrate.

Elements such as, for example, the gate and source lines and the TFTs form an uneven structure having a varying height surface due to the height or thickness difference among these elements.

In LCD devices having no interlayer insulating layer, the cell thickness may be undesirably nonuniform because an active matrix substrate and a counter substrate have an uneven surface due to elements having different thicknesses, such as TFTs, electrodes and color filters. It is well known that such an undesirably nonuniform cell thickness can be avoided by optimizing the conditions of providing the above-described elements. In general, the cell thickness is not made undesirably nonuniform by a thickness difference of several micrometers among regularly arranged elements such as, for example, gate and source lines, pixel electrodes and TFTs. Rather, the cell thickness is made undesirably nonuniform by elements which are randomly arranged with a pitch of as great as several millimeters (e.g., patterns for connection of driver ICs and terminals for supplying signals to the counter electrode), since base plates of the active matrix and counter substrates, which are generally formed of glass, are distorted in correspondence with the varying heights of the elements.

Even in LCD devices including an interlayer insulating layer, the surface of the active matrix substrate is not completely flat. Since the height of the interlayer insulating layer from the glass base plate is substantially determined by the height of the elements underneath the interlayer insulating layer, the flatness of the top surface of the interlayer insulating layer is determined by whether the areas between adjacent elements are properly filled with the interlayer insulating layer. Especially in the sealing portion, the surface of the uneven structure becomes more uneven due to the patterns for connection of driver ICs and terminals for the counter electrode which are randomly arranged with a pitch of as great as several millimeters. Thus, the cell thickness is likely to be undesirably nonuniform.

In the sealing portion, the degree of influence on the cell thickness varies in accordance with the height difference between the elements. With respect to each of a plurality of sides of the active matrix substrate, a height difference of several micrometers between adjacent elements which occur perpendicularly to a given side of the active matrix substrate do not cause an undesirably nonuniform cell thickness as long as similar height differences are present substantially entirely in the sealing portion. In contrast, height differences of several micrometers between two adjacent elements which occur parallel to a given side of the active matrix substrate do cause an undesirably nonuniform cell thickness for the following reason. When the height differences occur parallel to a given side of the active matrix substrate, the substrates cannot deform. Accordingly, the cell thickness varies with the higher elements acting as a fulcrum of a lever. Especially when the elements closer to the display area are higher than the other elements, the nonuniformity of the cell thickness significantly exerts an adverse influence on the display quality.

SUMMARY OF THE INVENTION

According to one aspect of the invention, a liquid crystal display device includes a first substrate; a second substrate; a liquid crystal layer interposed between the first substrate and the second substrate; and a sealing member formed of a sealing material for confining the liquid crystal layer between the first substrate and the second substrate, the sealing member defining a sealing portion. The first substrate includes a plurality of gate signal lines, a plurality of source signal lines, a plurality of switching devices disposed in the vicinity of intersections of the plurality of gate signal lines and the plurality of source signal lines, a plurality of pixel electrodes respectively connected to the plurality of source signal lines through the plurality of switching devices, and an interlayer insulating layer provided below the plurality of pixel electrodes and covering the plurality of switching devices, the plurality of gate signal lines and the plurality of source signal lines. The second substrate includes a counter electrode opposing the plurality of pixel electrodes with the liquid crystal layer interposed therebetween. The first substrate includes a part of the interlayer insulating layer and a plurality of terminals covered by the interlayer insulating layer in the sealing portion. A maximum height of protruding portions of the interlayer insulating layer along a top surface thereof is about 0.5 $\mu$m or less.

In one embodiment of the invention, the plurality of terminals are arranged so that a distance between two adjacent terminals is less than about 100 $\mu$m in a direction parallel to a given side of the active matrix substrate.

In one embodiment of the invention, a maximum height difference among the plurality of terminals is about 0.5 $\mu$m or less.

In one embodiment of the invention, the plurality of terminals include signal input terminals.

In one embodiment of the invention, the plurality of terminals further include dummy terminals.

In one embodiment of the invention, the interlayer insulating layer has a thickness of about 3 $\mu$m or more.

According to another aspect of the invention, a liquid crystal display device includes a first substrate; a second substrate; a liquid crystal layer interposed between the first substrate and the second substrate; and a sealing member formed of a sealing material for confining the liquid crystal layer between the first substrate and the second substrate, the sealing member defining a sealing portion. The first substrate includes a plurality of gate signal lines, a plurality of source signal lines, a plurality of switching devices disposed in the vicinity of intersections of the plurality of gate signal lines and the plurality of source signal lines, a plurality of pixel electrodes respectively connected to the plurality of source signal lines through the plurality of switching devices, and an interlayer insulating layer provided below the plurality of pixel electrodes and covering the plurality of switching devices, the plurality of gate signal lines and the plurality of source signal lines. The second substrate includes a counter electrode opposing the plurality of pixel electrodes with the liquid crystal layer interposed therebetween. The first substrate includes a part of the interlayer insulating layer and a plurality of terminals covered by the interlayer insulating layer in the sealing portion. A maximum depth difference of the interlayer insulating layer along a bottom surface thereof is about 0.5 $\mu$m or less.

In one embodiment of the invention, the maximum depth difference of the interlayer insulating layer along the bottom surface is less than about 100 $\mu$m in a direction parallel to a given side of the active matrix substrate.

Thus, the invention described herein makes possible the advantage of providing an LCD device for preventing an undesirably nonuniform cell thickness.

This and other advantages of the present invention will become apparent to those skilled in the art upon reading and understanding the following detailed description with reference to the accompanying figures.

DESCRIPTION OF THE PREFERRED EMBODIMENTS

As used herein, the term "stepped structure" represents various terminals (i.e., terminals of gate lines, source lines, etc.) provided on a base plate of an active matrix substrate. The stepped structure includes height differences among the various terminals, and thus has an uneven top surface. An interlayer insulating layer is provided on the base plate so as to cover the stepped structure and includes valleys varying in depth in accordance with the varying height of the stepped structure. The expression "maximum depth difference of the interlayer insulating layer along the bottom surface" represents the maximum depth difference between any two valleys along the bottom surface of the interlayer insulating layer. The term "maximum height of the protruding portions of the interlayer insulating layer along the top surface" represents the maximum height of slight protruding portions which are inevitably generated along a top surface of the interlayer insulating layer. According to the present invention, the maximum height of the protruding portions of the interlayer insulating layer along the top surface is sufficiently small to prevent the cell thickness from being undesirably nonuniform. The term "top surface of the interlayer insulating layer" represents one of two surfaces of the interlayer insulating layer which is closer to the sealing member than the terminals covered by the interlayer insulating layer. The term "bottom surface of the interlayer insulating layer" represents one of two surfaces of the interlayer insulating layer which is closer to the terminals covered by the interlayer insulating layer than the sealing member.

As used herein, the term "terminal" represents signal input terminals and dummy terminals. The term "terminal" can include conductive elements which are covered by an insulating film or a flattening film in addition to exposed conductive elements which are only covered by an interlayer insulating layer. The signal input terminals are, for example, patterns for connection of driver ICs and terminals for supplying signals to the counter electrode. The present invention is applicable for preventing nonuniformity of the cell thickness from being caused by elements other than the terminals.

In order to prevent the cell thickness from being undesirably nonuniform, the maximum height of the protruding portions of the interlayer insulating layer along the top surface needs to be reduced to about 0.5 $\mu$m or less by providing an interlayer insulating layer to cover the stepped structure, thereby compensating for the uneven top surface of the stepped structure. The above-mentioned value of 0.5 $\mu$m is a general tolerance regarding the cell thickness nonuniformity during the production process of LCD devices. The interlayer insulating layer is formed of a resin and has a thickness of several micrometers. Whether or not the areas between adjacent terminals are properly filled with the interlayer insulating layer depends on (1) the maximum height difference between the terminals, which also defines the maximum depth difference among the valleys in the interlayer insulating layer; and (2) the distance between two adjacent terminals, which also defines the distance between two adjacent valleys of the interlayer insulating layer.

Accordingly, the present inventors measured the maximum height of the protruding portions of the interlayer insulating layer along the top surface while changing (1) the maximum depth difference of the interlayer insulating layer along the bottom surface and (2) the distance between two adjacent valleys of the interlayer insulating layer. The results are shown in Table 1 below.

The interlayer insulating layer for which data is provided in Table 1 was formed, by spin-coating, of a photosensitive acrylic resin having a thickness of about 3 $\mu$m and a viscosity of 5 to 50 cps. The maximum depth difference of the interlayer insulating layer along the bottom surface was changed within the range of about 0.1 $\mu$m to about 1.0 $\mu$m. Generally, a TFT included in LCD devices has a height of about 1.0 $\mu$m.

TABLE 1

|  |  | Distance between two adjacent valleys of the interlayer insulating layer | | | | |
|---|---|---|---|---|---|---|
|  |  | 25 $\mu$m | 50 $\mu$m | 75 $\mu$m | 100 $\mu$m | 150 $\mu$m |
| Maximum depth difference of the interlayer insulating layer along the bottom surface | 0.1 $\mu$m | ○ | ○ | ○ | ○ | ○ |
|  | 0.2 $\mu$m | ○ | ○ | ○ | ○ | ○ |
|  | 0.3 $\mu$m | ○ | ○ | ○ | ○ | ○ |
|  | 0.4 $\mu$m | ○ | ○ | ○ | ○ | ○ |
|  | 0.5 $\mu$m | ○ | ○ | ○ | ○ | ○ |
|  | 0.7 $\mu$m | ○ | ○ | ○ | X | X |
|  | 1.0 $\mu$m | ○ | ○ | ○ | X | X |

○: Maximum height of the protruding portions of the interlayer insulating layer along the top surface ≦ 0.5 $\mu$m
X: Maximum height of the protruding portions of the interlayer insulating layer along the top surface > 0.5 $\mu$m As shown in Table 1, when the distance between adjacent valleys is about 100 $\mu$m or more, the areas between the adjacent terminals cannot be filled with the interlayer insulating layer. Accordingly, the top surface may undesirably reflect the uneven bottom surface of the interlayer insulating layer. Even when the distance between two adjacent valleys is more than about 100 $\mu$m, the maximum height of the protruding portions of the interlayer insulating layer along the top surface can be about 0.5 $\mu$m or less, as long as the maximum depth difference of the interlayer insulating layer along the bottom surface is about 0.5 $\mu$m or less.

As will be discussed in more detail below with respect to the figures, according to one embodiment of the present invention, a plurality of signal input terminals provided in an active matrix substrate (first substrate) and covered by the interlayer insulating layer are arranged so that the maximum height difference among the terminals is about 0.5 $\mu$m or less, in order to make a maximum depth difference of the interlayer insulating layer along the bottom surface about 0.5 $\mu$m or less in a sealing portion. Therefore, the maximum height of the protruding portions of the interlayer insulating layer along the top surface is no greater than about 0.5 $\mu$m, which is a general tolerance regarding the cell thickness nonuniformity during the production process of LCD devices.

According to another embodiment of the present invention, a plurality of signal input terminals provided in an active matrix substrate and covered by the interlayer insulating layer are arranged so that the distance between two adjacent terminals is less than about 100 $\mu$m, in order to make the distance between two adjacent valleys of the interlayer insulating layer less than about 100 $\mu$m in a sealing portion in a direction parallel to a given side of the active matrix substrate. Therefore, the maximum height of the protruding portions of the interlayer insulating layer along the top surface is no greater than about 0.5 $\mu$m, which is a general tolerance regarding the cell thickness nonuniformity during the production process of LCD devices.

According to still another embodiment of the present invention, in the case where the distance between two adjacent valleys of the interlayer insulating layer is about 100 $\mu$m or more in a sealing portion in a direction parallel to a given side of the active matrix substrate, the maximum height difference among the terminals is made about 0.5 $\mu$m or less, in order to make the maximum depth difference of the interlayer insulating layer along the bottom surface about 0.5 $\mu$m or less. Therefore, the maximum height of the protruding portions of the interlayer insulating layer along the top surface is no greater than about 0.5 $\mu$m, which is a general tolerance regarding the cell thickness nonuniformity during the production process of LCD devices.

According to still another embodiment of the present invention, a plurality of signal input terminals provided in an active matrix substrate and covered by the interlayer insulating layer are arranged so that the maximum height difference among the terminals is about 0.5 $\mu$m or less and also so that the distance between two adjacent terminals is about 100 $\mu$m or less. Such an arrangement is provided in order to make the distance between two adjacent valleys of the interlayer insulating layer about 100 $\mu$m or less in a direction parallel to a given side of the active matrix substrate and in order to make the maximum depth difference of the interlayer insulating layer along the bottom surface about 0.5 $\mu$m or less in a sealing portion. Therefore, the maximum height of the protruding portions of the interlayer insulating layer along the top surface is no greater than about 0.5 $\mu$m, which is a general tolerance regarding the cell thickness nonuniformity during the production process of LCD devices.

According to still another embodiment of the present invention, in the case where the distance between two adjacent terminals of a plurality of signal input terminals provided in an active matrix substrate and covered by the interlayer insulating layer is about 100 μm or more and additionally the maximum height difference among the terminals is more than about 0.5 μm in a sealing portion, one or more dummy terminals are provided between such two adjacent terminals. The dummy terminals have a substantially same height as that of at least one of such two adjacent terminals. Therefore, the distance between two adjacent valleys in a direction parallel to a given side of the active matrix substrate is about 100 μm or less. Thus, the maximum height of the protruding portions of the interlayer insulating layer along the top surface is no greater than about 0.5 μm, which is a general tolerance regarding the cell thickness nonuniformity during the production process of LCD devices.

Even when the distance between two adjacent terminals of a plurality of signal input terminals provided in an active matrix substrate and covered by the interlayer insulating layer in a direction parallel to a given side of the LCD device is about 100 μm or more, the maximum height of the protruding portions of the interlayer insulating layer along the top surface can be about 0.5 μm or less without providing a dummy terminal, as long as the maximum height difference among the terminals is about 0.5 μm or less. However, the top surface of the interlayer insulating layer can be further flattened by providing one or more dummy terminals between such two adjacent terminals and thus filling the areas between the adjacent terminals of the stepped structure more completely.

The dummy terminals are not involved in signal input. The dummy terminals can be formed in the same process step with or in a different process step from the terminals which are formed prior to the interlayer insulating layer (i.e., the gate signal lines, source signal lines, patterns for connection of driver ICs, terminals for supplying signals to the counter electrode, and the like).

EXAMPLE

Hereinafter, the present invention will be described by way of illustrative examples with reference to the accompanying drawings.

FIG. 1 is a plan view of an LCD device 100 in one example according to the present invention. As shown in FIG. 1, the LCD device 100 includes an active matrix substrate 200 (first substrate) and a counter substrate 300 (second substrate). The active matrix substrate 200 and the counter substrate 300 are assembled together by a sealing member 103 formed of a sealing material and disposed along perimeters of the active matrix substrate 200 and the counter substrate 300.

Figure 2:
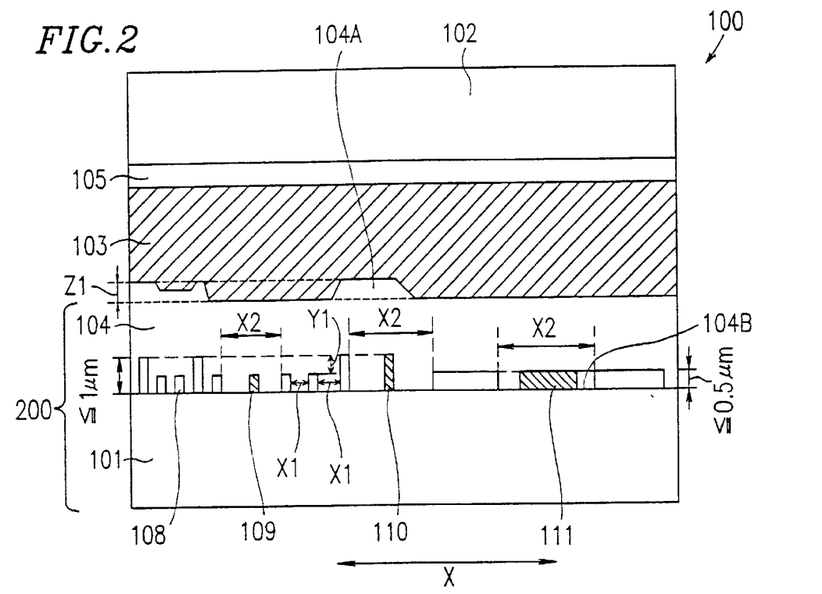
FIG. 2 is a cross-sectional view of the LCD device according to the present invention taken along line A–A' in FIG. 1.
Figure 3:
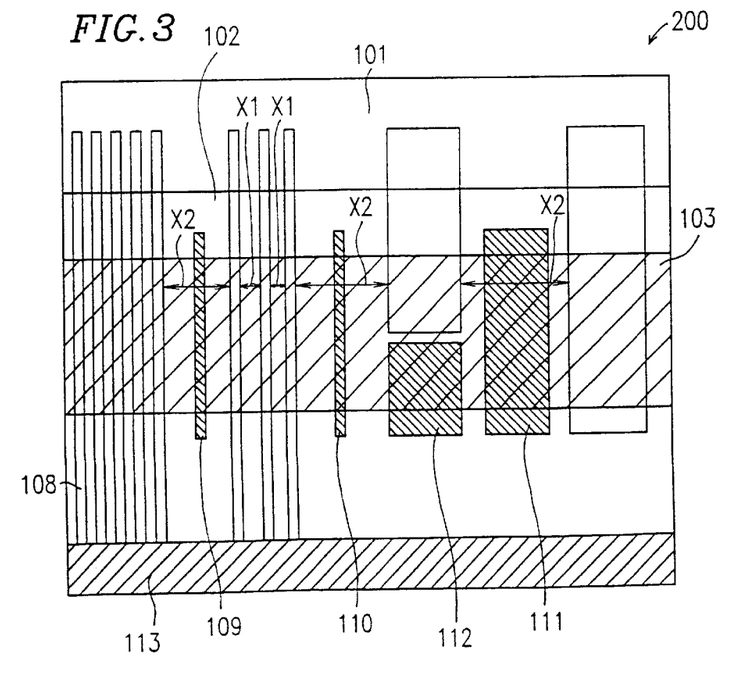
FIG. 3 is a partial top view of an active matrix substrate of the LCD device according to the present invention in portion B.
Figure 4:
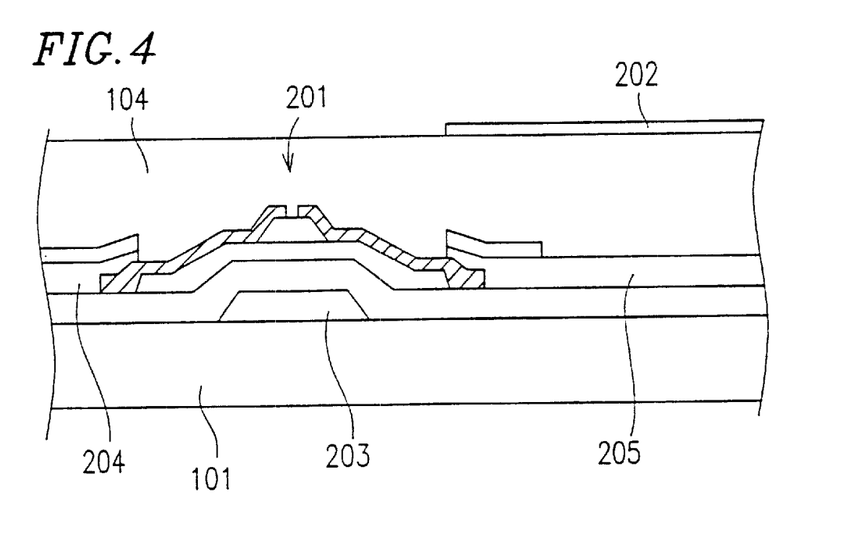
FIG. 4 is a cross-sectional view of a TFT included in the LCD device according to the present invention in section C.

FIG. 2 is a cross-sectional view of the LCD device 100 taken along line A–A' in FIG. 1. FIG. 3 is a partial top view of the active matrix substrate 200 in portion B (FIG. 1). FIG. 4 is a cross-sectional view of a TFT included in the active matrix substrate 200 in section C (FIG. 1).

As used herein, the term "display area" refers to an area where the counter substrate 300 face a plurality of pixel electrodes 202 (FIG. 4; only one is shown) included in the active matrix substrate 200 with a liquid crystal layer (not shown) interposed therebetween. In FIG. 1, the display area is represented by reference numeral 113. The pixel electrodes 202 are provided for applying an electric field to the liquid crystal layer.

As shown in FIGS. 2 and 3, the active matrix substrate 200 includes, between a base plate 101 of the active matrix substrate 200 and the sealing member 103, patterns for connection of driver ICs and a plurality of signal input terminals 108 which send signals to the counter substrate 300.

Distance X1 between two adjacent signal input terminals 108 in direction X is less than about 100 μm. Distance X2 between another two adjacent signal input terminals 108 in direction X is about 100 μm or more. Between every two signal input terminals 108 which are arranged with distance X2 (about 100 μm or more), dummy terminal 109, 110, 111 or 112 are provided. The dummy terminals 109 through 112 are not related to the signal input terminals 108 in so far as the dummy terminals 109 through 112 do not perform signal processing. The dummy terminals 109, 110, 111 and 112 have a height substantially equal to at least one of the two signal input terminals 108 interposing each of the dummy terminals 109, 110, 111 and 112. A maximum height difference Y1 among the signal input terminals 108 is about 0.5 μm or less. In this example, the terminals 108, 109, 110, 111 and 112 form a stepped structure.

An interlayer insulating layer 104 is disposed so as to cover the signal input terminals 108 and the dummy terminals 109, 110, 111 and 112 and also so as to extend to a display area (represented by reference numeral 113 in FIG. 1). The sealing member 103 is disposed on the interlayer insulating layer 104. The interlayer insulating layer 104 has protruding portions 104A caused by some of the terminals provided on the base plate 101.

As shown in FIG. 2, the counter substrate 300 (FIG. 1) includes a base plate 102, a black matrix 105 and a counter electrode (not shown).

As shown in FIG. 1, the active matrix substrate 200 includes gate signal lines 203a (only one is shown) and source signal lines 204a (only one is shown) crossing the gate signal lines 203a. In the vicinity of each of intersections of the gate signal lines 203a and the source signal lines 204a, a TFT 201 (section C) is disposed. The gate signal lines 203a are provided for supplying a scanning signal to a gate electrode of the respective TFT 201, and the source signal lines 204a are provided for supplying a video signal to a source electrode of the TFT 201. FIG. 4 is a cross-sectional view of one TFT 201 and the vicinity thereof. The TFT 201 includes a gate electrode 203 branched from each of the gate signal lines 203a (FIG. 1), a source electrode 204 branched from each of the source signal lines 204a (FIG. 1), and a drain electrode 205. The interlayer insulating layer 104 is disposed so as to cover the TFT 201. A pixel electrode 202 is disposed on the interlayer insulating layer 104 so as to be partially overlap the respective gate signal line 203a and the respective source signal line 204a. The pixel electrode 202 is connected to the drain electrode 205 through a contact hole (not shown) formed in the interlayer insulating layer 104. In this example, the interlayer insulating layer 104 is formed by spin-coating of a photosensitive acrylic resin film having a thickness of about 3 μm. Next, the contact hole is formed through the interlayer insulating layer 104, and then the pixel electrode 202 is formed by spin-coating and patterning.

Referring to FIGS. 2 and 3, in this example, the signal input terminals 108 and the dummy terminals 109, 110, 111 and 112 are arranged so as to fulfill the following conditions in the entire area covered by the sealing member 103: Distance X1 between two adjacent signal input terminals 108 in direction X is less than about 100 μm. Between every two signal input terminals 108 which are arranged with distance X2 (about 100 μm or more), at least one dummy terminal 109, 110, 111 or 112 is provided. Accordingly, the distance between two adjacent terminals, which includes both signal input terminals 108 and the dummy terminals 109 through 112, is less than about 100 μm. The maximum height difference Y1 among the signal input terminals 108 is about 0.5 μm or less.

A maximum height Z1 of the protruding portions 104A of the interlayer insulating layer 104 is, for example, about 0.5 μm or less. The interlayer insulating layer 104 also has valleys along a bottom surface 104B due to the above-described terminals. An average depth difference between adjacent valleys of the interlayer insulating layer 104 along the bottom surface 104B is, for example, about 0.3 μm, and a maximum depth difference of the interlayer insulating layer 104 along the bottom surface 104B is, for example about 0.6 μm. An average distance between two adjacent valleys of the interlayer insulating layer 104 along the bottom surface 104B is, for example, about 20 μm, and a maximum distance between two adjacent valleys of the interlayer insulating layer 104 along the bottom surface 104B is, for example, about 80 pm. In the case where the thickness of the interlayer insulating layer 104 is about 3 μm, the maximum height of the protruding portions 104A is reduced down to, for example, about 0.15 μm.

In the display area 113, the pixel electrodes 202 (FIG. 4) overlap the gate signal lines 203a (FIG. 1) and the source signal lines 204a (FIG. 1) which are formed of a metal material, and thus the entire display area 113 excluding the gate and source signal lines 203 and 204 and the TFTs 201 is usable as an aperture for display. Accordingly, the numerical aperture of the LCD device 100 is increased, thereby significantly improving the brightness of the display.

COMPARATIVE EXAMPLE

Figure 7:
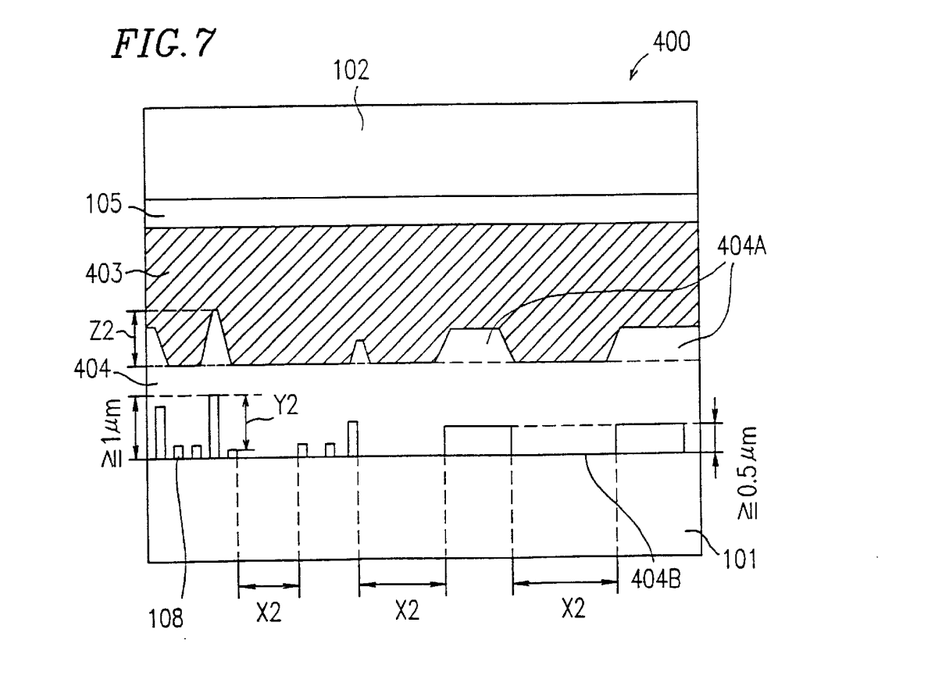
FIG. 7 is a cross-sectional view of the conventional LCD device taken along line A–A' in FIG. 1.

For comparison, a conventional LCD device 400 is shown in FIG. 7. The LCD device 400 in the comparative example has the same plan view as that of the LCD device 100 according to the present invention, and thus FIG. 1 is referred to also as the plan view of the LCD device 400 for simplicity. The portion of the LCD device 400 shown in FIG. 7 corresponds to the portion of the LCD device 100 shown in FIG. 2. The LCD device 400 is mainly different from the LCD device 100 in the interface between the interlayer insulating layer 404 and the sealing member 403.

Below the sealing member 403, a plurality of signal input terminals 108 are disposed randomly so that some of adjacent signals 108 have distance X2 (about 100 μm or more) therebetween. A maximum height difference Y2 among the signal input terminals 108 (i.e., maximum depth difference of the interlayer insulating layer 404 along the bottom surface 404B) is more than about 0.5 μm. The interlayer insulating layer 404 has protruding 404A, which reflect the pattern of the signal input terminals 108. In this comparative example, the randomly arranged terminals 108 form a stepped structure.

The interlayer insulating layer 404 includes valleys along a bottom surface 404B thereof due to the above-described terminals. An average depth difference of the interlayer insulating layer 404 along the bottom surface 404B is about 0.3 μm, and a maximum depth difference of the interlayer insulating layer 404 along the bottom surface 404B is about 0.6 μm. An average distance between two adjacent valleys of the interlayer insulating layer 404 along the bottom surface 404B is about 50 μm, and a maximum distance between two adjacent valleys of the interlayer insulating layer 404 along the bottom surface 404B is about 200 μm. In the case where the thickness of the interlayer insulating layer 404 is about 3 μm, a maximum height Z2 of the protruding portions 404A is about 0.6 μm. The value of Z2 (about 0.6 μm) exceeds the tolerance regarding the cell thickness nonuniformity during the production process of LCD devices, which is 0.5 μm.

Comparison of Nonuniformity of Cell Thickness

Figure 5:
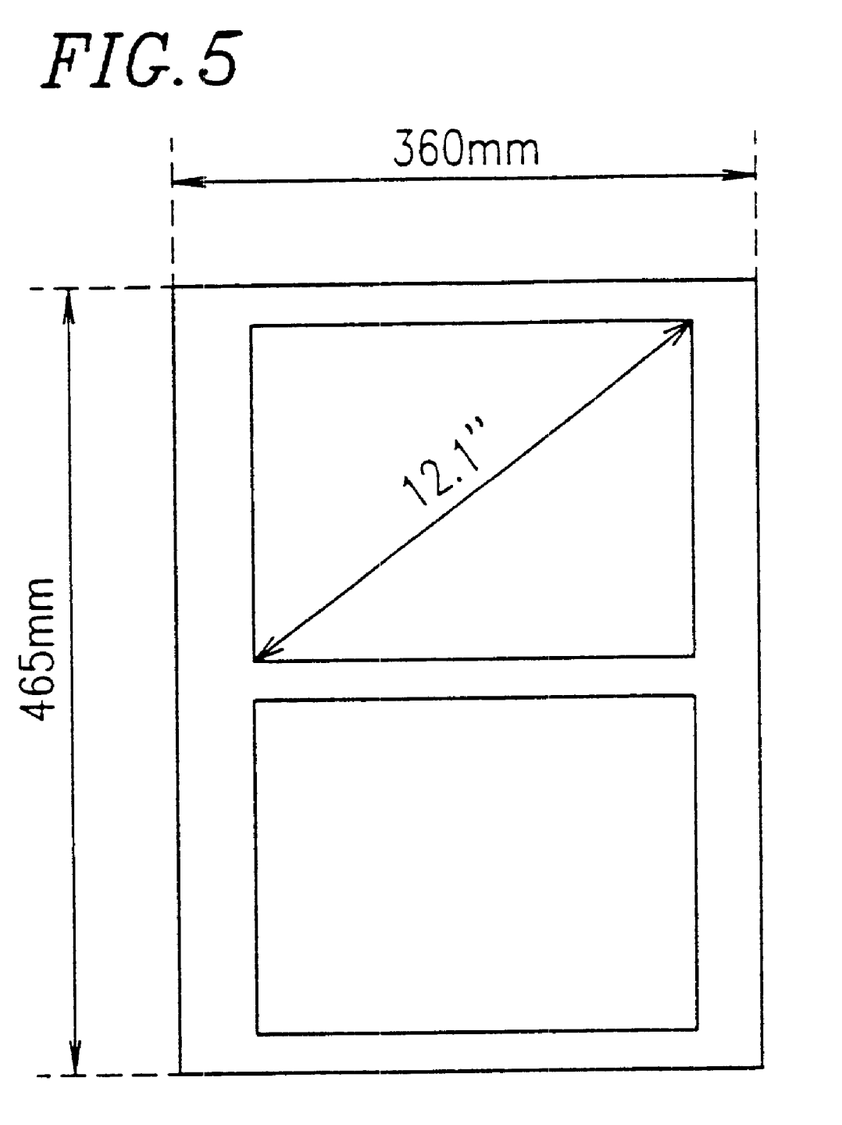
FIG. 5 is a plan view of a glass plate used for producing LCD devices for evaluation.

Samples of the LCD device 100 according to the present invention and the LCD device 400 in the comparative example, both having a display size of 12.1 inches, were produced for evaluation, using a glass plate assembly (planar size: 465 mm×360 mm) as shown in FIG. 5. Two samples were obtained from one such glass plate assembly. The uniformity of cell thickness was evaluated regarding the vicinity of an area where the sealing member 103, 403 was provided. More particularly, the evaluation was conducted at a position which is 1 mm inward from an edge 103A (FIG. 1) of the sealing member 103, 403.

Figure 6:
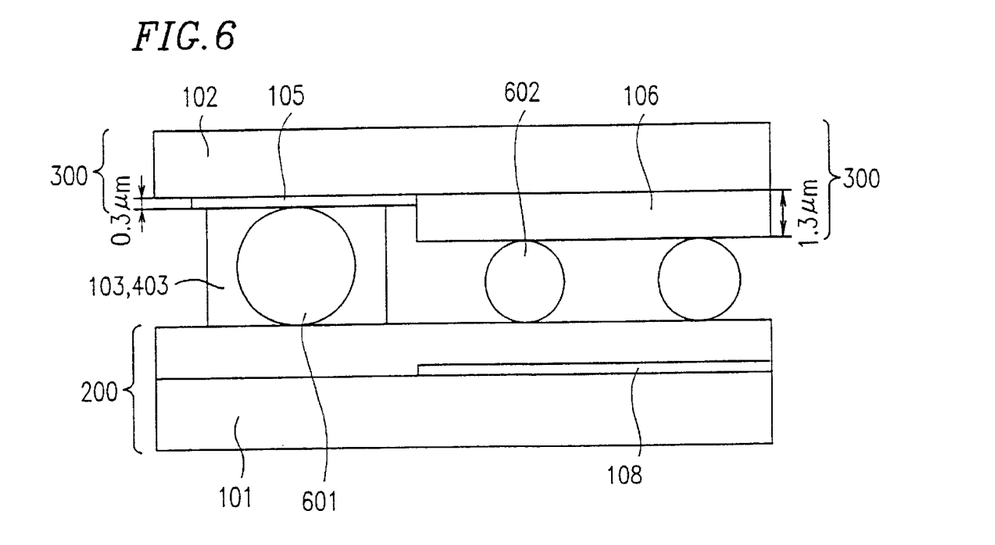
FIG. 6 is a schematic cross-sectional view of the LCD device according to the present invention and the conventional LCD device taken along line D–D' in FIG. 1.

FIG. 6 is a schematic cross-sectional view of a sample taken along line D–D' of FIG. 1. The counter substrate 102 includes a color filter 106 having stripes of red (R), green (G) and blue (B) and a light blocking layer 105 (black matrix) formed of chrome for blocking light.

The sealing member 103, 403 was formed of a thermosetting resin (XN-21S produced by Mitsui Toatsu Chemicals, Inc.) As spacers 602 used in the display area (represented by reference numeral 113 in FIG. 1), plastic spacers having a diameter of 4.5 μm (SP-2045 produced by Sekisui Fine Chemical Co., Ltd.) were used. As spacers 601 (only one is shown in FIG. 6) disposed in the sealing layer 103, 403, glass fibers having a diameter of 5.5 μm (PF-55 produced by Nippon Denki Kagaku Co., Ltd.) were used. The diameter of the spacers 601 in the sealing member 103, 403 and the diameter of the spacers 602 in the display area 113 were different for the following reason. The spacers 601 in the sealing member 103, 403 are disposed on the light blocking layer 105 having a thickness of about 0.3 μm, whereas the spacers 602 in the display area 113 are disposed on the color filter 106 having a thickness of about 1.3 μm. Thus, the diameter of the spacers 601 needs to be greater than the diameter of the spacers 602 by the difference between the thicknesses of the light blocking layer 105 and the color filter 106, namely, about 1 μm, to compensate for this difference.

In the actual production process, a sealing material and a UV-curable resin for preliminary adhesion were applied on the counter substrate 300, and a conductive resin (so-called common transfer) for electrically connecting the counter electrode (not shown) to a terminal on the active matrix substrate was applied on the active matrix substrate 200. Then, the spacers 601 and 602 were scattered on either substrate 200 or 300. After that, the active matrix substrate 200 and the counter substrate 300 were positionally aligned, and the UV-curable resin was cured so as to fix the active matrix substrate 200 and the counter substrate 300 to each other. The thickness of the sealing resin was reduced to an intended cell thickness by simultaneously applying heat and pressure, and then the sealing resin was cured. From the glass plate assembly shown in FIG. 5, two LCD devices were cut away. A liquid crystal material was injected into the space between the active matrix substrate 200 and the counter substrate 300 through an opening (not shown) in the sealing material with respect to each LCD device. In this manner, 40 LCD devices 100 were produced from 20 such glass plate assemblies as shown in FIG. 5, and 40 LCD devices 400 were produced from another 20 such glass plate assemblies.

These LCD devices were compared regarding the cell thickness uniformity. The LCD devices 400 in the comparative example had an average cell thickness of about 4.51 $\mu$m and a standard deviation of about 0.15 $\mu$m, whereas the LCD devices 100 according to the present invention had an average cell thickness of about 4.50 $\mu$m and a standard deviation of about 0.10 $\mu$m. It has been confirmed that the present invention improves the cell thickness uniformity. The improved cell thickness uniformity reduces the unevenness of the light transmittance, thereby enhancing the display quality.

The present invention provides the following effects, for example.

The interlayer insulating layer provided in the display area is extended to the sealing portion. In the sealing portion, a plurality of terminals provided in the active matrix substrate are covered by the interlayer insulating layer. The maximum height of the protruding portions of the interlayer insulating layer along the top surface is about 0.5 $\mu$m or less. Thus, the cell thickness is substantially prevented from being undesirably nonuniform.

Since the maximum depth difference of the interlayer insulating layer along the bottom surface is about 0.5 $\mu$m or less, the maximum height of the protruding portions of the interlayer insulating layer along the top surface is about 0.5 $\mu$m or less. Thus, the cell thickness substantially prevented from being undesirably nonuniform.

Since the maximum depth difference of the interlayer insulating layer along the bottom surface is less than about 100 $\mu$m in a direction parallel to a given side of the active matrix substrate, the maximum height of the protruding portions of the interlayer insulating layer along the top surface is about 0.5 $\mu$m or less. Thus, the top surface of the interlayer insulating layer is sufficiently flat.

The distance between two adjacent terminals is less than about 100 $\mu$m in a direction parallel to a given side of the active matrix substrate. Accordingly, the distance between two adjacent valleys of the interlayer insulating layer can be less than about 100 $\mu$m. The areas between the adjacent terminals of the stepped structure can be properly filled with the interlayer insulating layer. As a result, the maximum height of the protruding portions of the interlayer insulating layer along the top surface is about 0.5 $\mu$m or less. Thus, the surface is sufficiently flat.

The maximum height difference among the terminals is about 0.5 $\mu$m or less. Accordingly, the maximum depth difference of the interlayer insulating layer along the bottom surface can be about 0.5 $\mu$m or less. Thus, the areas between the adjacent terminals of the stepped structure can be property filled with the interlayer insulating layer. As a result, the maximum height of the protruding portions of the interlayer insulating layer along the top surface is about 0.5 $\mu$m or less. Thus, the surface is sufficiently flat.

The plurality of terminals can be, for example, signal input terminals, such as patterns for connection of the driver ICs and terminals for supplying signals to the counter electrode. The plurality of terminals further include dummy terminals which are not involved in signal input.

The interlayer insulating layer has a thickness of about 3 $\mu$m or more. This is sufficient to compensate for the top surface of the uneven structure in a display area, the uneven structure including gate signal lines having a thickness of about 0.3 $\mu$m, source signal lines having a thickness of about 0.3 $\mu$m and TFTs having a thickness of about 1 $\mu$m. The thickness of about 3 $\mu$m is also sufficient to reduce the parasitic capacitances between the pixel electrodes and the gate signal lines, and the parasitic capacitances between the pixel electrodes and the source signal lines. As a result, the numerical aperture is increased and the display quality is enhanced.

As described above, an undesirably nonuniform cell thickness is not likely to occur even when the bottom surface of the interlayer insulating layer has a height difference of about several micrometers in a direction perpendicular to a given side of the active matrix structure, whereas an undesirably nonuniform cell thickness is likely to occur when the bottom surface of the interlayer insulating layer has a height difference of about several micrometers in a direction parallel to a given side of the active matrix substrate. According to the present invention, criteria are provided for the distance between two adjacent terminals in a direction parallel to a given side of the active matrix substrate.

An undesirably nonuniform cell thickness is not likely to occur in a display area owing to the substantially regular arrangement of signal lines and pixel electrodes, whereas an undesirably nonuniform cell thickness is likely to occur in a sealing portion due to the random arrangement of terminals having different heights. According to the present invention, criteria are provided for the distance between two adjacent terminals and height of the terminal in a sealing portion.

An LCD device having a substantially uniform cell thickness allows light to transmit therethrough substantially uniformly. Since the pixel electrodes overlap the gate and source signal lines and the TFTs in a display area, the numerical aperture is increased and thus the brightness of the display is improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:

a first substrate;

a second substrate;

a liquid crystal layer interposed between the first substrate and the second substrate;

a sealing member formed of a sealing material for confining the liquid crystal layer between the first substrate and the second substrate, the sealing member defining a sealing portion;

wherein the first substrate includes:

a plurality of gate signal lines, a plurality of source signal lines, a plurality of switching devices disposed in the vicinity of intersections of the plurality of gate signal lines and the plurality of source signals lines, a plurality of pixel electrodes respectively connected to the plurality of source signal lines through the plurality of switching devices, and an interlayer insulating layer provided below the plurality of pixel electrodes and covering the plurality of switching devices, the plurality of gate signal lines and the plurality of source signal lines;

wherein the second substrate includes a counter electrode opposing the plurality of pixel electrodes with the liquid crystal layer interposed therebetween; and wherein the first substrate includes a plurality of terminals of different heights covered by the interlayer insulating layer at the sealing portion, the terminals being randomly spaced from one another on the first substrate, wherein a maximum height difference Y of adjacent terminals at the sealing portion is about 0.5 μm or less; and wherein a maximum height of protruding portions of the interlayer insulating layer along a top surface thereof is about 0.5 μm or less proximate the sealing portion due to said maximum height difference Y of adjacent terminals at the sealing portion.

2. A liquid crystal display device according to claim 1, wherein the plurality of terminals are arranged so that a distance between two adjacent terminals is less than about 100 μm in a direction parallel to a given side of the active matrix substrate.

3. A liquid crystal display device according to claim 1, wherein a maximum height difference among the plurality of terminals is about 0.5 μm or less.

4. A liquid crystal display device according to claim 1, wherein the plurality of terminals include signal input terminals.

5. A liquid crystal display device according to claim 4, wherein the plurality of terminals further include dummy terminals.

6. A liquid crystal display device according to claim 1, wherein the interlayer insulating layer has a thickness of about 3 μm or more.

7. A liquid crystal display device, comprising:
a first substrate;
a second substrate;
a liquid crystal layer interposed between the first substrate and the second substrate;
a sealing member formed of a sealing material for confining the liquid crystal layer between the first substrate and the second substrate, the sealing member defining a sealing portion;
wherein the first substrate includes:
a plurality of gate signal lines,
a plurality of source signal lines,
a plurality of switching devices disposed in the vicinity of intersections of the plurality of gate signal lines and the plurality of source signal lines,
a plurality of pixel electrodes respectively connected to the plurality of source signal lines through the plurality of switching devices, and
an interlayer insulating layer provided below the plurality of pixel electrodes and covering the plurality of switching devices, the plurality of gate signal lines and the plurality of source signal lines,
wherein the second substrate includes a counter electrode opposing the plurality of pixel electrodes with the liquid crystal layer interposed therebetween;
wherein the first substrate includes a plurality of terminals covered by the interlayer insulating layer at the sealing portion, the terminals being randomly spaced from one another on the first substrate, wherein a maximum height difference Y of different sized adjacent terminals at the sealing portion is about 0.5 μm or less; and
wherein a maximum depth difference of the interlayer insulating layer along a bottom surface thereof is about 0.5 μm or less proximate the sealing portion.

8. A liquid crystal display device according to claim 7, wherein the maximum depth difference of the interlayer insulating layer along the bottom surface proximate the sealing portion is less than about 100 μm in a direction parallel to a given side of the first substrate.

9. The display of claim 7, further comprising:
a number of dummy terminals provided at least partially between at least certain of said terminals at the sealing portion, said number and spacing apart of said dummy terminals being chosen so that a maximum depth difference of the interlayer insulating layer along a bottom surface thereof is about 0.5 μm or less proximate the sealing portion, and wherein said maximum depth difference of the interlayer insulating layer would not have been about 0.5 μm or less proximate the sealing portion absent said dummy terminals.

10. The display device of claim 1, wherein certain of said terminals have a height of at least about twice as great as immediately adjacent terminals.

11. The display device of claim 7, wherein certain of said terminals have a height of at least about twice as great as immediately adjacent terminals.

12. A liquid crystal display device, comprising:
a first substrate;
a second substrate;
a liquid crystal layer interposed between the first substrate and the second substrate;
a sealing member formed of a sealing material for confining the liquid crystal layer between the first substrate and the second substrate, the sealing member defining a sealing portion;
wherein the first substrate includes:
a plurality of gate signal lines,
a plurality of source signal lines,
a plurality of switching devices disposed in the vicinity of intersections of the plurality of gate signal lines and the plurality of source signals lines,
a plurality of pixel electrodes respectively connected to the plurality of source signal lines through the plurality of switching devices, and
an interlayer insulating layer provided below the plurality of pixel electrodes and covering the plurality of switching devices, the plurality of gate signal lines and the plurality of source signal lines;
wherein the second substrate includes a counter electrode opposing the plurality of pixel electrodes with the liquid crystal layer interposed therebetween; and
wherein the first substrate includes a plurality of terminals covered by the interlayer insulating layer at the sealing portion, said terminals being signal input terminals;
wherein a maximum height of protruding portions of the interlayer insulating layer along a top surface thereof is about 0.5 μm or less proximate the sealing portion; and
wherein certain of said signal input terminals have a height at least twice as great as a height of an immediately adjacent one of said signal input terminals.

13. The display device of claim 12, further comprising at least one dummy terminal.

14. The display device of claim 12, wherein a maximum height difference among the plurality of terminals is about 0.5 μm or less.

15. The display device of claim 12, wherein the interlayer insulating layer has a thickness of about 3 μm or less.

16. The display device of claim 12, wherein the plurality of terminals are arranged so that a distance between two immediately adjacent ones of the terminals is less than about 100 μm in a direction parallel to a given side of the active matrix substrate.

* * * * *